United States Patent
Tanaka et al.

(10) Patent No.: US 9,188,159 B2
(45) Date of Patent: Nov. 17, 2015

(54) HALF THRUST BEARING AND BEARING DEVICE

(71) Applicant: DAIDO METAL COMPANY LTD., Nagoya (JP)

(72) Inventors: Shiho Tanaka, Inuyama (JP); Yoshihiro Ozawa, Inuyama (JP); Shinya Maitani, Inuyama (JP); Takeharu Yamamoto, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 14/182,623

(22) Filed: Feb. 18, 2014

(65) Prior Publication Data

US 2014/0233874 A1    Aug. 21, 2014

(30) Foreign Application Priority Data

Feb. 21, 2013   (JP) .................................. 2013-032218

(51) Int. Cl.
*F16C 9/02* (2006.01)
*F16C 33/04* (2006.01)
*F16C 17/04* (2006.01)

(52) U.S. Cl.
CPC ................ *F16C 33/046* (2013.01); *F16C 9/02* (2013.01); *F16C 17/04* (2013.01)

(58) Field of Classification Search
CPC .............. F16C 9/02; F16C 9/04; F16C 17/02; F16C 17/022; F16C 17/04; F16C 17/10; F16C 33/046
USPC .......... 384/275, 276, 288, 294, 303, 305, 420
See application file for complete search history.

(56) References Cited

U.S. PATENT DOCUMENTS

| 5,114,246 | A |   | 5/1992  | Gowan |
| 6,149,310 | A | * | 11/2000 | Ono et al. ..................... 384/420 |
| 7,134,793 | B2 | * | 11/2006 | Thompson et al. ........... 384/294 |
| 7,354,199 | B2 | * | 4/2008  | Welch et al. .................. 384/294 |
| 2003/0128902 | A1 |   | 7/2003  | Kennedy |
| 2010/0260449 | A1 |   | 10/2010 | Lehmann et al. |
| 2012/0155790 | A1 | * | 6/2012  | Hattori et al. ................ 384/368 |

FOREIGN PATENT DOCUMENTS

| JP | 11-201145     | 7/1999  |
| JP | 2001-323928   | 11/2001 |
| WO | WO2009/062904 | 5/2009  |

OTHER PUBLICATIONS

Extended European Search Report dated Jun. 2, 2014 in corresponding European patent application Serial No. 14155945.0 (four pages).

* cited by examiner

*Primary Examiner* — James Pilkington

(74) *Attorney, Agent, or Firm* — Harness, Dickey & Pierce, PLC

(57) ABSTRACT

A half thrust bearing having a semicircular ring shape for receiving an axial force of a crankshaft of an internal combustion engine is provided. The half thrust bearing includes thrust reliefs formed adjacently to end surfaces on both sides in a circumferential direction on a slide surface side which receives the axial force so that wall thicknesses become thinner toward the end surfaces. The thrust relief on a rear side in a rotational direction of the crankshaft or both thrust reliefs are formed so that a length of the thrust relief in an inner end portion in a radial direction of the half thrust bearing is longer than a length of the thrust relief in an outer end portion in the radial direction of the half thrust bearing.

12 Claims, 12 Drawing Sheets

HALF THRUST BEARING AND BEARING DEVICE

BACKGROUND OF THE INVENTION

1. Field of the Invention

The present invention relates to a thrust bearing and a bearing device that receive an axial force of a crankshaft of an internal combustion engine.

2. Description of the Related Art

The crankshaft of an internal combustion engine is rotatably supported, at a journal portion thereof, in a cylinder block lower portion of the internal combustion engine via a main bearing that is configured by combining a pair of half bearings in a cylindrical shape.

One or both of a pair of half bearings are used in combination with a half thrust bearing that receives a force in the axial direction of the crankshaft. The half thrust bearing is placed on at least one of both end surfaces of the half bearings in the axial direction.

The half thrust bearing receives the force in the axial direction that occurs in the axial direction of the crankshaft. Namely, the half thrust bearings are disposed for the purpose of bearing the force in the axial direction that is inputted to the crankshaft when the crankshaft is connected with a transmission by a clutch, or the like.

On a slide surface side of a half thrust bearing, thrust reliefs are formed so that the thickness of a member becomes thinner toward circumferential end surfaces in the vicinity of both ends in the circumferential direction of the half thrust bearing. In general, in the thrust relief, the length from the end surface in the circumferential direction of the half thrust bearing to the slide surface, and the depth at the end surface in the circumferential direction are made constant irrespective of a position in the radial direction. The thrust relief is formed to absorb positional displacement of the end surfaces of a pair of half thrust bearings at the time of assembling the half thrust bearings in a split type bearing housing (see FIG. 10 of JP-A-H11-201145).

The crankshaft of an internal combustion engine is borne, at the journal portion thereof, in the cylinder block lower portion of the internal combustion engine via a main bearing formed by a pair of half bearings. Lubricating oil is fed into a lubricating oil groove that is formed along an inner circumferential surface of the main bearing through a through-hole in a wall of the main bearing from an oil gallery in a cylinder block wall. In this manner, the lubricating oil is supplied into the lubricating oil groove of the main bearing, and thereafter, is supplied to the half thrust bearing.

Incidentally, in recent years, oil pumps for supplying lubricating oil of internal combustion engines have been downsized, and therefore, the supply amount of the lubricating oil to the bearings has been decreased. Accordingly, the leakage amount of the lubricating oil from the end surfaces of the main bearings becomes decreased, and the supply amount of the lubricating oil to half thrust bearings has also tended to decrease. As a countermeasure against it, for example, the art of enhancing oil retainability for lubricating oil by forming fine grooves to be provided side by side on the slide surface of a half thrust bearing is proposed (see JP-A-2001-323928).

SUMMARY OF THE INVENTION

In recent years, in order to reduce weights of internal combustion engines, shaft diameters of crankshafts have been reduced, and the crankshafts have become lower in rigidity than conventional crankshafts. Therefore, deflection has easily occurred in the crankshafts at the time of operation of the internal combustion engines, and vibration of the crankshafts has tended to become large. Accordingly, the slide surfaces of the half thrust bearings and thrust collar surfaces of the crankshafts tends to be in direct contact with each other, and damage (seizure) is easily occurred.

JP-A-2001-323928 discloses the configuration that supplies lubricating oil to the substantially entire surface of the bearing surface by providing oil grooves on the slide surface. However, even if the art of JP-A-2001-323928 is adopted, it is especially difficult to prevent the slide surface in close vicinity of the thrust relief on the rear side in the crankshaft rotational direction of the half thrust bearing from contacting the thrust collar of the crankshaft a long as the vibration due to deflection of the crankshaft described above is large. Therefore, there is the possibility of occurrence of seizure on the slide surface of the half thrust bearing.

Thus, the present invention has an object to provide a half thrust bearing and a bearing device in which seizure hardly occurs at the time of operation of an internal combustion engine.

In order to attain the above-described object, a half thrust bearing of the present invention is a half thrust bearing having a semicircular ring shape for receiving an axial force of a crankshaft of an internal combustion engine, and includes thrust reliefs formed on a slide surface side that receives the axial force adjacently to end surfaces on both sides in a circumferential direction so that wall thicknesses become thinner toward the end surfaces, wherein the thrust relief on a rear side in a rotational direction of the crankshaft or both thrust reliefs are formed so that a length of the thrust relief in an inner end portion in a radial direction of the half thrust bearing is longer than a length of the thrust relief in an outer end portion in the radial direction of the half thrust bearing.

Here, the crankshaft intends a member including a journal portion, a crankpin portion and a crank arm portion. Further, the half thrust bearing intends a member having a shape obtained by dividing a circular ring shape into substantially halves, but the halves may not be halves in the strict sense.

The half thrust bearing of the present invention is a half thrust bearing having a semicircular ring shape that receives the axial force of the crankshaft of the internal combustion engine. The thrust relief on the rear side in the rotational direction of the crankshaft or both thrust reliefs are formed so that the length of the thrust relief in the inner end portion in the radial direction of the half thrust bearing is longer than the length of the thrust relief in the outer end portion in the radial direction of the half thrust bearing. By this configuration, a large amount of lubricating oil is fed to the slide surface of the half thrust bearing, and therefore, even when deflection occurs in the crankshaft at the time of operation of the internal combustion engine and vibration becomes large, the slide surface of the half thrust bearing and the thrust collar surface of the crankshaft are hardly in direct contact with each other, and a damage to the slide surface of the half thrust bearing hardly occurs.

DETAILED DESCRIPTION OF THE INVENTION

Hereinafter, embodiments of the present invention will be described with reference to the drawings.

Embodiment 1

Entire Configuration of Bearing Device

Figure 1:
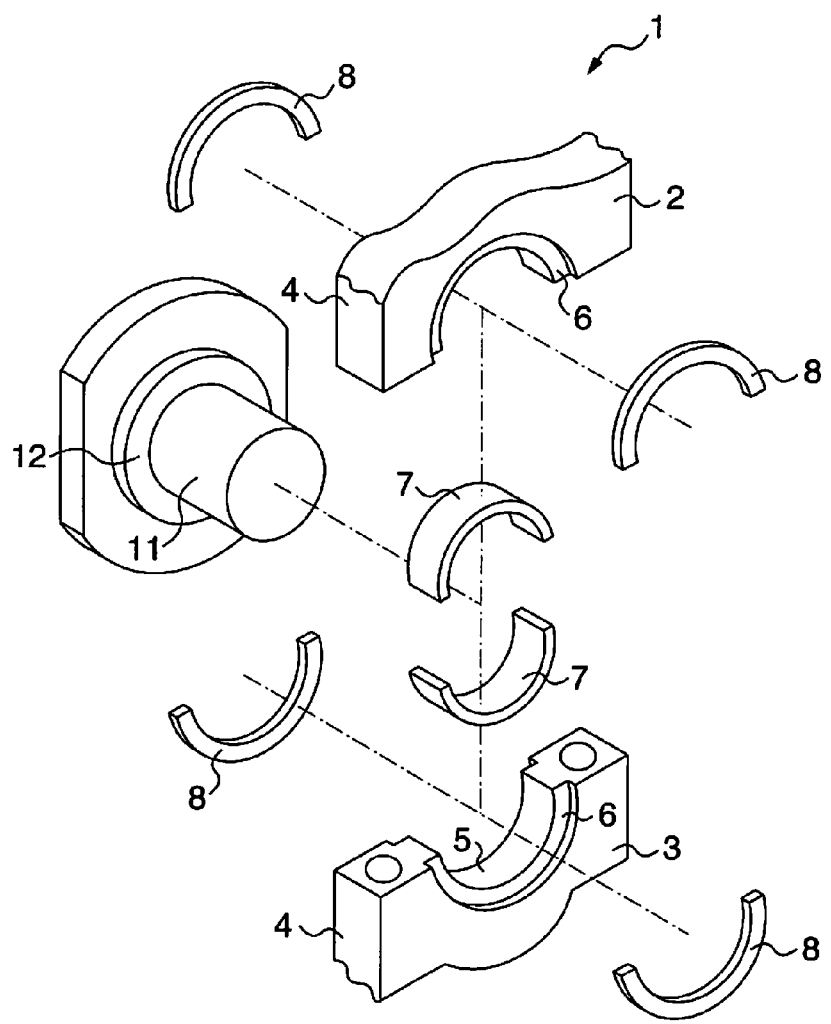
FIG. 1 is an exploded perspective view of a bearing device.
Figure 6:
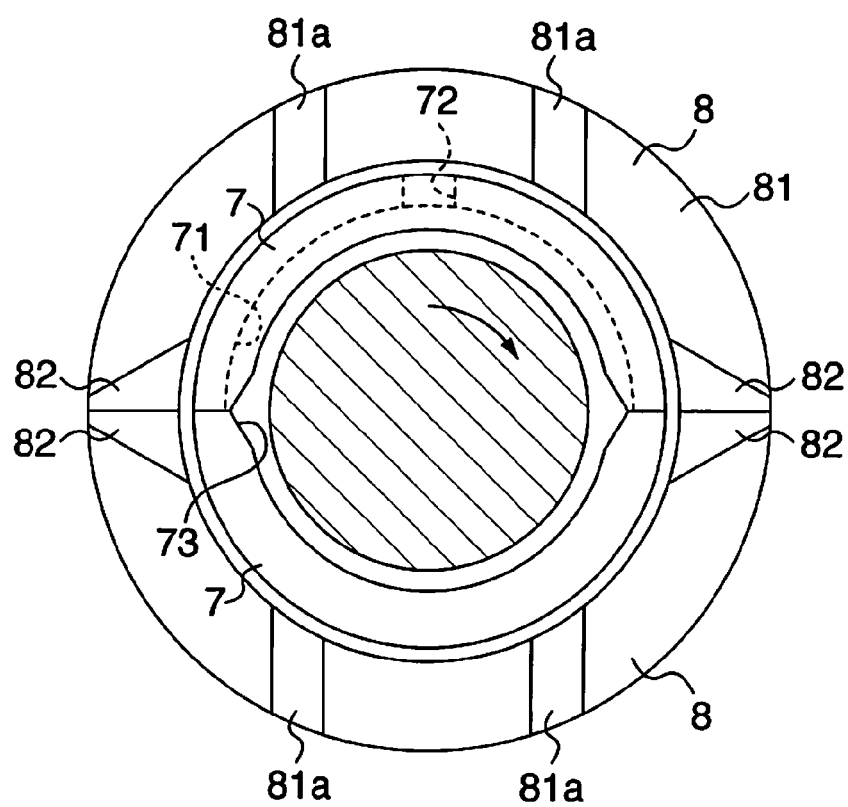
FIG. 6 is a front view of a half bearing and a thrust bearing.
Figure 7:
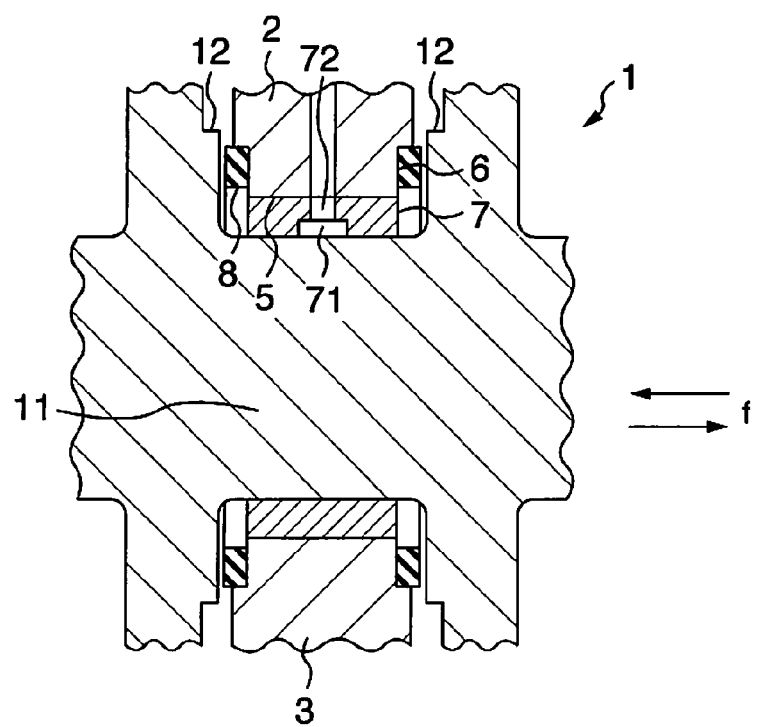
FIG. 7 is a sectional view of the bearing device.

First, with use of FIGS. 1, 6 and 7, an entire configuration of a bearing device 1 including a half thrust bearing 8 of the present invention will be described. As shown in FIGS. 1, 6 and 7, in a bearing housing 4 that is configured by attaching a bearing cap 3 to a lower portion of a cylinder block 2, a bearing hole 5 that is a circular hole that penetrates through both side surfaces is formed, and at an circumferential edge of the bearing hole 5 in the side surface, receiving seats 6 and 6 that are concave portions in a circular ring shape are formed. Half bearings 7 and 7 that rotatably bear a journal portion 11 of a crankshaft are combined into a cylindrical shape and are fitted in the bearing hole 5. Half thrust bearings 8 and 8 that receive an axial force f (see FIG. 7) via a thrust collar 12 of the crankshaft are combined into a circular ring shape and fitted in the receiving seats 6 and 6.

As shown in FIG. 6, a lubricating oil groove 71 is formed on an inner circumferential surface of the half bearing 7 on a cylinder block 2 side (an upper side) of the half bearings 7 configuring the main bearing, and a through-hole 72 that penetrates from the lubricating oil groove 71 to an outer circumferential surface is formed. Note that the lubricating oil grooves may be formed in both upper and the lower half bearings.

Further, in the half bearing 7, crush reliefs 73 and 73 are formed at both ends adjacently to abutment surfaces of the half bearings 7 (see FIG. 6). The crush relief 73 is a wall thickness decreasing region that is formed so that a wall thickness of a region adjacent to a circumferential end surface of the half bearing 7 becomes gradually thinner toward the circumferential end surface. The crush reliefs 73 are formed for absorbing positional displacement and deformation of butting surfaces in a state in which the pair of half bearings 7 and 7 are assembled.

(Configuration of Half Thrust Bearing)

Next, a configuration of a half thrust bearing 8 of the embodiment will be described with use of FIGS. 2 to 7. The half thrust bearing 8 of the present embodiment is formed into a flat plate having a semicircular ring shape from a bimetal in which a thin bearing alloy layer is bonded onto a back metal layer of steel. The half thrust bearing 8 includes a slide surface 81 (a bearing surface) that is a surface configured by the bearing alloy layer in a central region, and thrust reliefs 82 and 82 in regions adjacent to end surfaces 83 and 83 on both sides in the circumferential direction. In order to enhance retainability of the lubricating oil, two oil grooves 81a and 81a are formed between the thrust reliefs 82 and 82 on both sides on the slide surface 81.

The thrust reliefs 82 are wall thickness decreasing regions that are formed in regions adjacent to the end surfaces on both sides in the circumferential direction in a slide surface 81 side so that wall thicknesses thereof become gradually thinner toward the end surfaces, and are formed throughout an entire length in a radial direction on the end surfaces in the circumferential direction of the half thrust bearing 8. The thrust reliefs 82 are formed to reduce positional displacement of the circumferential end surfaces 83 and 83 of the pair of half thrust bearings 8 and 8, which is caused by positional displacement or the like at the time of assembling the half thrust bearings 8 into the split-type bearing housing 4.

A surface of the thrust relief 82 is configured as a flat surface, but may be configured as a curved surface. When the surface is a flat surface, the surface can be configured by a single flat surface, or can be configured by combining a plurality of flat surfaces. When the surface is a curved surface, the surface also can be configured as a single curved surface, or can be configured by combining a plurality of curved surfaces. Further, the surface of the thrust relief 82 may be configured by combining a flat surface and a curved surface.

Figure 2:
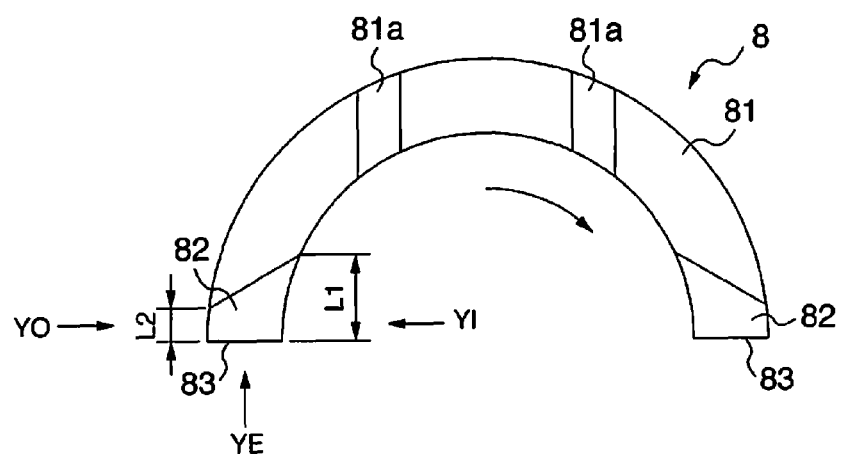
FIG. 2 is a front view of a half thrust bearing of embodiment 1.

As shown in FIG. 2, the thrust relief 82 of the present embodiment has different lengths at an inner end portion and an outer end portion in the radial direction of the surface of the thrust relief 82, and the surface of the thrust relief 82 (the slide surface side) inclines in the radial direction. In other words, in the half thrust bearing 8 of the present embodiment, a length L1 of the thrust relief 82 at the inner end portion in the radial direction is longer than a length L2 at the outer end portion in the radial direction.

Here, the lengths L1 and L2 refer to lengths that are measured in the perpendicular direction from a flat surface passing through the end surface 83 of the half thrust bearing 8. The length L1 of the inner end portion is defined by a length up to a point at which the surface of the thrust relief 82 intersects an inner circumferential edge of the slide surface 81, and the length L2 of the outer end portion is defined by a length up to a point at which the surface of the thrust relief 82 intersects an outer circumferential edge of the slide surface 81.

Figure 3:
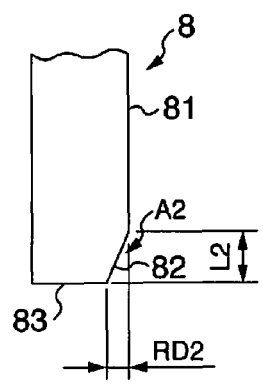
FIG. 3 is a side view seen from an arrow YO of FIG. 2 of a thrust relief of the half thrust bearing of embodiment 1.
Figure 4:
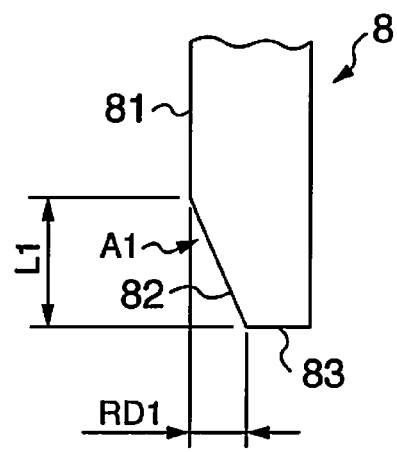
FIG. 4 is a side view seen from an arrow YI of FIG. 2 of the thrust relief of the half thrust bearing of embodiment 1.
Figure 5:
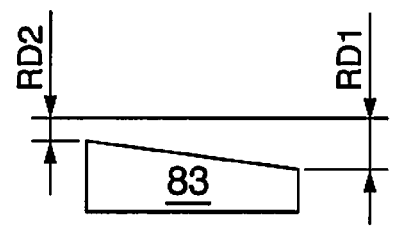
FIG. 5 is an end view seen from an arrow YE of FIG. 2 of the thrust relief of the half thrust bearing of embodiment 1.

FIG. 3 shows a side surface of a region in the vicinity of the end portion in the circumferential direction of the half thrust bearing 8 seen from an outer side (a direction seen from an arrow YO in FIG. 2). Similarly, FIG. 4 shows a side surface of the region in the vicinity of the end portion in the circumferential direction of the half thrust bearing 8 seen from an inner side (a direction seen from an arrow YI in FIG. 2). FIG. 5 shows the end surface 83 in the circumferential direction of the half thrust bearing 8 (a direction seen from an arrow YE in FIG. 2).

As shown in FIGS. 3 to 5, the surface of the thrust relief 82 of the half thrust bearing 8 is formed to be thinner toward the inner side in the radial direction. Namely, in the circumferential end surface 83, a depth RD1 of the inner end portion in the radial direction of the thrust relief 82 of the half thrust bearing 8 is made deeper than a depth RD2 of the outer end portion in the radial direction.

Here, the depths RD1 and RD2 refer to distances from a flat surface passing through the slide surface 81 of the half thrust bearing 8. In other words, the depths RD1 and RD2 refer to the distances that are measured perpendicularly from a virtual slide surface when the slide surface 81 is extended over the thrust relief 82 and is set as a virtual slide surface. The depth RD1 of the inner end portion is defined by a depth up to a point at which the surface of the thrust relief 82 intersects the inner circumferential edge of the slide surface 81, on the circumferential end surface 83 of the half thrust bearing 8. Similarly, the depth RD2 of the outer end portion is defined by a depth up to a point at which the surface of the thrust relief 82 intersects the outer circumferential edge of the slide surface 81.

Further, an area A2 of a thrust relief clearance in the outer end portion is smaller than an area A1 of a thrust relief clearance in the inner end portion. Here, "the thrust relief clearance" refers to a space that is surrounded by the surface of the thrust relief 82, a flat surface (the virtual slide surface) that forms the slide surface 81, a flat surface (a virtual end surface) that forms the circumferential end surface 83, a semi-cylindrical surface that forms an inner circumferential surface of the thrust bearing 8 and a semi-cylindrical surface that forms an outer circumferential surface of the thrust bearing 8.

The area A1 of the thrust relief clearance refers to an area in a range surrounded by the surface of the thrust relief 82 at the inner end portion of the slide surface 81 of the half thrust bearing 8, a virtual extension line that is formed by extending the slide surface 81 over the thrust relief 82, and a virtual extension line formed by extending the circumferential end surface 83 of the half thrust bearing 8 to the thrust relief clearance, seen from the radial direction of the half thrust bearing 8. Similarly, the area A2 of the thrust relief clearance refers to an area in a range that is surrounded by the surface of the thrust relief 82 at the outer end portion of the slide surface 81 of the half thrust bearing 8, a virtual extension line that is formed by extending the slide surface 81 over the thrust relief 82, and a virtual extension line formed by extending the circumferential end surface 83 of the half thrust bearing 8 to the thrust relief clearance, seen from the radial direction of the half thrust bearing 8.

As specific dimensions of the thrust relief 82, in the case of the crankshaft of a compact internal combustion engine of a passenger car or the like (with a diameter of a journal portion of about 30 to 100 mm), the following dimensions can be adopted, for example. Namely, the depth RD1 of the inner end portion in the radial direction of the thrust relief 82 at the end surface of the thrust relief 82 from the slide surface 81 in the circumferential end portion of the half thrust bearing 8 is set at 0.3 mm to 1.0 mm, the depth RD2 of the outer end portion in the radial direction of the thrust relief 82 can be set at 0.05 mm to 0.5 mm. Further, the length L1 of the inner end portion in the radial direction of the thrust relief 82 is set at 2.5 mm to 20 mm, and the length L2 of the outer end portion in the radial direction of the thrust relief 82 can be set at 0.5 mm to 5 mm.

Note that the aforementioned dimensions are just one example, and the dimensions are not limited to the above dimensional range.

Ranges of numeric values of the depth RD1 and the depth RD2 of the thrust relief described above partially overlap each other. However, this is because as the size of the bearing becomes larger, the depth of the thrust relief needs to be larger. Accordingly, the depths RD1 and RD2 of the thrust relief should be set as RD1>RD2 within the respective numeric value ranges. The same applies to the length L1 and the length L2 of the thrust relief.

(Operation)

Next, with use of FIGS. 6 and 7, operation of the half thrust bearing 8 of the present embodiment will be described.

(Oil Feeding Operation)

In the bearing device 1, the lubricating oil that is pressurized and discharged from an oil pump (not illustrated) passes through the through-hole 72 that penetrates through the wall of the half bearing 7 from an internal oil path of the cylinder block 2, and is supplied to the lubricating oil groove 71 on the inner circumferential surface of the half bearing 7. The lubricating oil that is supplied into the lubricating oil groove 71 is partially supplied to the inner circumferential surface of the half bearing 7, partially enters an opening of an internal oil path of the crankshaft not illustrated on a surface of the journal portion to be fed to a crankpin side, and partially flows to an outside from both ends in the width direction of the half bearings 7 and 7, through a clearance between the surfaces of the crush reliefs 73 of the pair of half bearings 7 and 7 that configure the main bearing, and the surface of the journal portion 11 of the crankshaft.

The center of the half bearing 7 is matched with the center of the half thrust bearing 8, a horizontal line connecting both end surfaces in the circumferential direction of the half bearing 7 configuring the main bearing is formed to be parallel with a horizontal line connecting both end surfaces in the circumferential direction of the half thrust bearing 8, and positions of the crush reliefs 73 correspond to positions of the thrust reliefs 82. Accordingly, the lubricating oil that flows out to the outside from both ends in the width direction of the main bearing (the half bearings 7) mainly flows into clearances (thrust relief clearances) between the surfaces of the thrust reliefs 82 of the half thrust bearing 8 and the surface of the thrust collar 12 of the crankshaft.

(Supply Operation of Lubricating Oil)

Hereinafter, an operation at a rear side in a rotational direction of the crankshaft, where an operational effect of the present invention is more remarkable will be described.

In the thrust relief 82 of the half thrust bearing 8 of the present embodiment, the length L1 of the inner end portion in the radial direction of the thrust relief 82 is made longer than the length L2 of the outer end portion in the radial direction. Therefore, the lubricating oil that flows out to the outside from the crush relief clearances of the half bearing 7 easily flows into the thrust relief clearances through the long length L1 on the inner side. Further, the lubricating oil that flows into the thrust relief clearances hardly flows out to the outside from the thrust relief clearances through the short length L2 on the outer side.

Further, in the thrust relief 82 of the half thrust bearing 8 of the present embodiment, the depth RD1 of the inner end portion in the radial direction of the thrust relief 82 is made larger than the depth RD2 of the outer end portion in the radial direction, on the end surface 83 in the circumferential direction. Accordingly, an inward drag component can be caused to act on the lubricating oil that tends to move outward in the radial direction in response to a centrifugal force.

As above, the lubricating oil that flows into the thrust relief clearance on the rear side in the rotational direction of the crankshaft hardly flows to the outside from the thrust relief clearance, and therefore, a large amount of lubricating oil is fed to the slide surface 81.

Because of the respective operations described above, the slide surface 81 of the half thrust bearing 8 and the crankshaft hardly contact each other. Namely, at the time of operation of the internal combustion engine, in particular, under the operation conditions in which the crankshaft rotates at a high speed, deflection (deflection in the axial direction) occurs in the crankshaft, and vibration of the crankshaft becomes large. By the large vibration, the axial force f toward the slide surface 81 of the half thrust bearing 8 periodically occurs in the crankshaft. The slide surface 81 of the half thrust bearing 8 receives the axial force f.

In the conventional type of the half thrust bearing including the thrust relief in which the length from the circumferential end surface of the half thrust bearing to the slide surface, and the depth from the slide surface on the circumferential end surface are made constant in the radial direction of the half thrust bearing, the lubricating oil that flows into the thrust relief clearance receives a centrifugal force, and an amount of the lubricating oil that flows to the outside from the thrust relief clearance on the outer side in the radial direction is large.

Meanwhile, in the half thrust bearing 8 of the present invention, even if the axial force f of the crankshaft acts, the lubricating oil easily flows into the thrust relief clearance on the rear side in the rotational direction of the crankshaft as described above, and the lubricating oil that flows in hardly flows to the outside. Therefore, a large amount of lubricating oil is fed to the slide surface 81. By the large amount of lubricating oil, the slide surface 81 of the half thrust bearing 8 and the surface of the thrust collar 12 of the crankshaft are hardly brought into direct contact with each other.

(Effects)

Next, effects of the half thrust bearing 8 of the present embodiment will be listed and described.

(1) The half thrust bearing 8 of the present embodiment includes the thrust reliefs 82 and 82. In the thrust relief 82 on the rear side in the rotational direction of the journal portion 11 or each of both thrust reliefs 82 and 82, the length L1 of the thrust relief 82 in the inner end portion in the radial direction of the half thrust bearing 8 is longer as compared with the length L2 of the thrust relief 82 in the outer end portion in the radial direction of the half thrust bearing 8. Therefore, the lubricating oil easily flows into the thrust relief clearance through the relatively long length L1 on the inner side. Further, the lubricating oil that flows into the thrust relief clearance hardly flows to the outside from the thrust relief clearance through the relatively short length L2 on the outer side.

(2) Further, in the thrust relief 82 on the rear side in the rotational direction of the crankshaft or each of both thrust reliefs 82 and 82, the depth RD1 from the slide surface 81 in the inner end portion in the radial direction of the half thrust bearing 8 is deeper as compared with the depth RD2 from the slide surface 81 in the outer end portion in the radial direction of the half thrust bearing 8, on the circumferential end surface 83 of the half thrust bearing 8. Therefore, the inward drag component can be caused to act on the lubricating oil that tends to move outward in the radial direction in response to the centrifugal force.

(3) Furthermore, in the half thrust bearing 8 of the present embodiment, the thrust relief clearance area A2 in the outer end portion in the radial direction of the half thrust bearing 8 is smaller than the thrust relief clearance area A1 in the inner end portion in the radial direction of the half thrust bearing 8. Therefore, the lubricating oil easily flows into the thrust relief clearance, and in addition, the lubricating oil that flows in hardly flows to the outside from the thrust relief clearance.

Note that as shown in FIGS. 2 and 7, in the present embodiment, the case of forming the thrust reliefs of the configuration of the present invention at both end portions in the circumferential direction of the half thrust bearing 8 is described, but the present invention is not limited to this. If at least the thrust relief 82 on the rear side in the rotational direction of the crankshaft is formed as the configuration of the present invention, the operational effect of the present invention can be obtained.

Here, "the thrust relief on the rear side in the rotational direction of the crankshaft" indicates the thrust relief 82 which an arbitrary point on the thrust collar 12 of the rotating crankshaft passes firstly, out of the thrust reliefs 82 located at both end portions, when attention is paid to the single half thrust bearing 8.

However, by forming the thrust reliefs of the configuration of the present invention on both of a front side and the rear side in the rotational direction of the crankshaft of the half thrust bearing 8, such effects are provided that the half thrust bearing 8 on the input side of the axial force f and the half thrust bearing 8 on the opposite side are caused to have the common configurations, and erroneous assembly can be prevented.

Further, unlike the present invention, a configuration in which the thrust relief is not opened to the outside diameter side of the half thrust bearing, that is, a configuration in which the outer end portion in the radial direction of the thrust relief is located in the end surface of the half thrust bearing also can be adopted. However, in that case, the slide surface that is present on the outer side of the outer end portion of the half thrust bearing in which the thrust relief is not formed directly contacts the shaft, and therefore, a damage occurs more easily than in the half thrust bearing in which the conventional thrust reliefs are formed.

Furthermore, a similar damage easily occurs in the case in which the configuration of the thrust relief of the present invention is not formed at the circumferential end portion of the half thrust bearing, but a concave portion clearance corresponding to the configuration of the thrust relief is formed in only a portion other than the circumferential end portion. This is because a large amount of lubricating oil is supplied to the circumferential end portion regions of the half thrust bearing through the crush reliefs of the half bearing, while the supply amount of the lubricating oil is small in the other regions.

Embodiment 2

Hereinafter, with use of FIGS. 8 and 9, a half thrust bearing 8A including the thrust relief 82 of a different mode from that of embodiment 1 will be described. Note that explanation of the same or equivalent portions as the contents described in the aforementioned embodiment will be made by assigning the same reference signs thereto.

(Configuration)

First, a configuration will be described. The entire configuration of the bearing device 1 of the present embodiment is similar to that of embodiment 1. A configuration of the half thrust bearing 8A is also substantially similar to embodiment 1 except for the shapes of the thrust reliefs 82 and 82.

Figure 8:
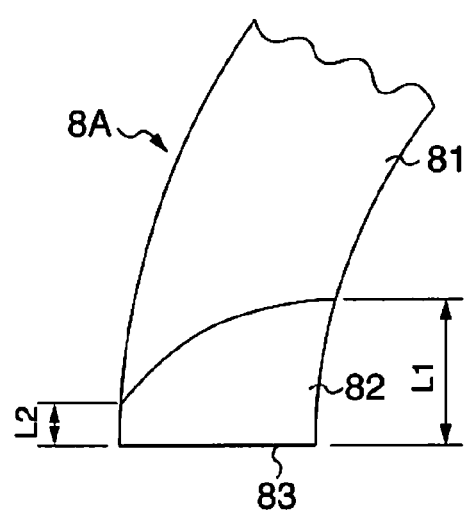
FIG. 8 is a front view of a thrust relief of embodiment 2.
Figure 9:
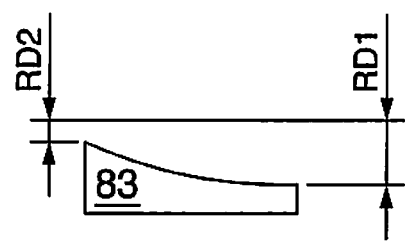
FIG. 9 is an end view showing an end surface in a circumferential direction of the thrust relief of FIG. 8.

However, the thrust relief 82 of the half thrust bearing 8A of the present embodiment is configured by a curved surface, as shown in FIGS. 8 and 9. The curved surface is formed so that the thrust relief clearance becomes larger than the flat surface described in embodiment 1. In other words, the curved surface is recessed into a concave shape toward an opposite surface side from the slide surface 81 side (downward in FIG. 9).

Besides the above, the relation of the length L1 and the length L2, the relation of the depth RD1 and the depth RD2, and the relation of the area A1 and the area A2 are similar to those in embodiment 1.

(Operation/Effect)

Next, operation and an effect will be described. The thrust relief 82 of the half thrust bearing 8A of the present embodiment is configured by the curved surface, unlike embodiment 1. The curved surface is recessed into the concave shape toward the opposite surface side from the slide surface 81 side. Therefore, as compared with the case in which the surface of the thrust relief 82 is configured by a flat surface, a volume of the thrust relief clearance increases. Accordingly, the amount of the lubricating oil in the relief clearance also increases, and the amount of the lubricating oil that is fed to the slide surface 81 also increases.

Note that other configurations, and the operation and effects are substantially similar to those of embodiment 1, and therefore, explanation thereof will be omitted.

Embodiment 3

Hereinafter, with use of FIGS. 10 to 13, half thrust bearings 8B and 8C that include the thrust relief 82 in a different mode from those of embodiments 1 and 2 will be described. Note that explanation of the same or equivalent portions as the contents described in the aforementioned embodiments will be made by assigning the same reference signs thereto.

(Configuration)

First, a configuration will be described. An entire configuration of the bearing device 1 of the present embodiment is similar to that of embodiment 1. A configuration of the half thrust bearing 8B is substantially similar to that of embodiment 1 except for the shapes of the thrust reliefs 82 and 82.

Figure 10:
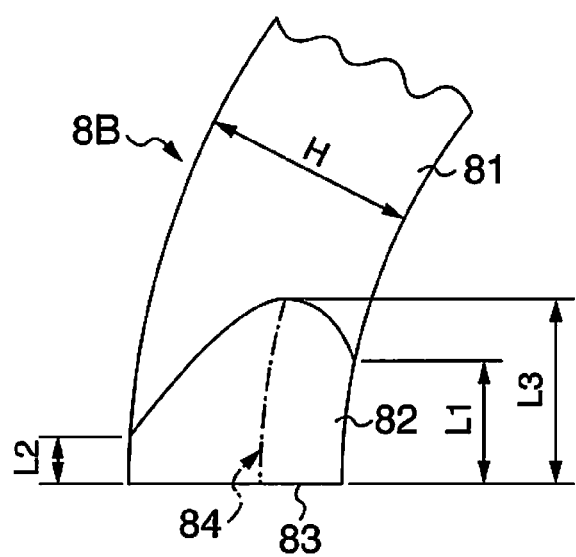
FIG. 10 is a front view of a thrust relief of embodiment 3.
Figure 11:
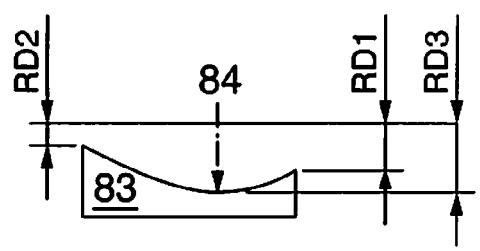
FIG. 11 is an end view showing an end surface in a circumferential direction of the thrust relief of FIG. 10.

However, in the half thrust bearing 8B of the present embodiment, in the thrust relief 82 on a rear side in the rotational direction of the crankshaft or each of both thrust reliefs 82 and 82, a length L3 of the thrust relief in a predetermined position between an inner end portion and an outer end portion in the radial direction becomes longer as compared with the thrust relief length L1 in the inner end portion in the radial direction, as shown in FIGS. 10 and 11. In other words, in the half thrust bearing 8B, the thrust relief length gradually increases toward a predetermined position near the center in the radial direction from the inner end portion in the radial direction, and the thrust relief length gradually increases toward the predetermined position near the center in the radial direction from the outer end portion in the radial direction.

Further, in the half thrust bearing 8B of the present embodiment, in the thrust relief 82 on the rear side in the rotational direction of the crankshaft or each of both thrust reliefs 82 and 82, a depth RD3 of the thrust relief 82 from the slide surface 81 in a predetermined position between the inner end portion and the outer end portion in the radial direction becomes deeper as compared with the depth RD1 of the thrust relief 82 from the slide surface 81 in the inner end portion, on the circumferential end surface 83 of the half thrust bearing 8B, unlike embodiments 1 and 2. In other words, the thrust relief depth gradually increases toward the predetermined position (a deepest portion 84) near the center in the radial direction from the inner end portion in the radial direction of the half thrust bearing 8B, and the thrust relief depth gradually increases toward the predetermined position near the center in the radial direction from the outer end portion in the radial direction.

Further, the deepest portion 84 in the section of the thrust relief 82 perpendicular to the circumferential direction of the half thrust bearing 8B is located nearer to the inner end portion than the outer end portion in an entire range in the circumferential direction. In other words, the longest length L3 and the deepest depth RD3 of the thrust relief 82 are located on a near side to the inner end edge in the radial direction of the half thrust bearing 8B from a central position of a slide surface width (H) in the radial direction of the half thrust bearing 8B.

As specific dimensions of the thrust relief 82, in the case of the crankshaft of a compact internal combustion engine of a passenger car or the like (with a diameter of a journal portion of around 30 to 100 mm), the depth RD1 and the depth RD2, and the length L1 and the length L2 of the thrust relief 82 are similar to those in embodiment 1. The thrust relief length L3 at the predetermined position where the thrust relief length becomes the longest can be made, for example, 4 to 25 mm, and the thrust relief depth RD3 at the predetermined position where the thrust relief length L3 becomes the deepest can be made 0.4 to 1.5 mm. The aforementioned dimensions are mere examples, and the dimensions are not limited to the dimensional ranges.

Note that the depth RD3 and the length L3 include the ranges that overlap the ranges of the depth RD1 and the length L1 described above, and it is obvious that the depth RD3 and the length L3 should satisfy L3>L1, and RD3>RD1 in the respective numeric ranges.

(Operation/Effect)

Next, operation and an effect of the half thrust bearing 8B of the present embodiment will be described.

(1) In the half thrust bearing 8B of the present embodiment, the length L3 of the thrust relief 82 in the predetermined position between the inner end portion and the outer end portion is longer as compared with the length L1 of the thrust relief 82 in the inner end portion.

(2) Furthermore, in the circumferential end surface 83 of the half thrust bearing 8B, the depth RD3 of the thrust relief 82 from the slide surface 81 in the predetermined position 84 between the inner end portion and the outer end portion is deeper as compared with the depth RD1 of the thrust relief 82 from the slide surface 81 in the inner end portion.

According to the configuration as above, as compared with embodiments 1 and 2, the volume itself of the thrust relief clearance becomes large, and therefore, the amount of the lubricating oil that flows into the thrust relief clearance increases.

Figure 14:
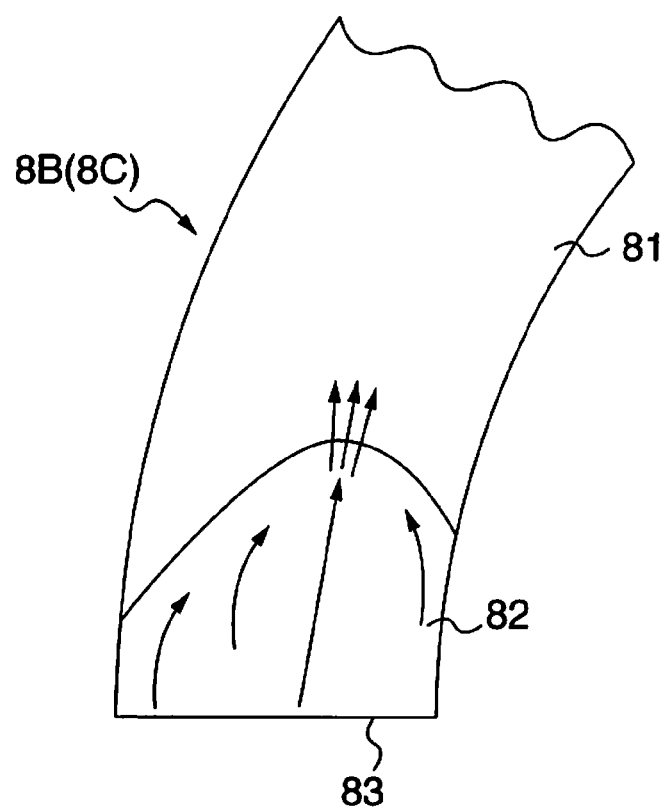
FIG. 14 is an operation view explaining operation of the thrust relief of embodiment 3.

Further, a boundary (an upper edge line) formed with the slide surface 81 of the thrust relief 82 is in a convex shape toward the slide surface 81 side, and therefore, the lubricating oil in the thrust relief clearance flows toward the predetermined position where the length becomes the maximum length L3 of the thrust relief 82 as shown in FIG. 14. Namely, as shown in FIG. 14, in a vicinity of the boundary in the convex shape, the width and the depth of the thrust relief clearance decrease along the circumferential direction, and the volume of the thrust relief clearance abruptly decreases. Accordingly, the pressure of the lubricating oil becomes high.

Furthermore, as shown in FIG. 14, in the half thrust bearing 8B of the present embodiment, the slide surface 81 is present on both end portion sides (a left and a right in the page space) in the width direction of the thrust relief clearance, and therefore, the lubricating oil the pressure of which becomes high in the clearance gathers on the slide surface 81 on the distal side in the vicinity of the position to be the maximum length L3 of the thrust relief and easily flows.

(3) Further, the deepest portion 84 in the section of the thrust relief 82 that is perpendicular to the circumferential direction of the half thrust bearing 8B is located nearer to the inner end portion than the outer end portion in the entire range in the circumferential direction.

Accordingly, the lubricating oil hardly flows to the outside from the thrust relief clearance. Namely, the lubricating oil in the thrust relief clearance follows the thrust collar surface 12 of the crankshaft that is rotating and is fed to the slide surface 81 side. During this while, a centrifugal force acts on the lubricating oil, and therefore, the lubricating oil tends to flow toward the portion near to the outer side in the radial direction. In the present embodiment, more lubricating oil flows to a portion near to the inner side in the radial direction in the thrust relief clearance of the half thrust bearing 8B, and therefore, even if the centrifugal force acts on the lubricating oil and the lubricating oil moves toward the outer side, the lubricating oil hardly flows to the outside from the outer end portion in the radial direction of the thrust relief clearance of the half split thrust bearing 8B.

Figure 12:
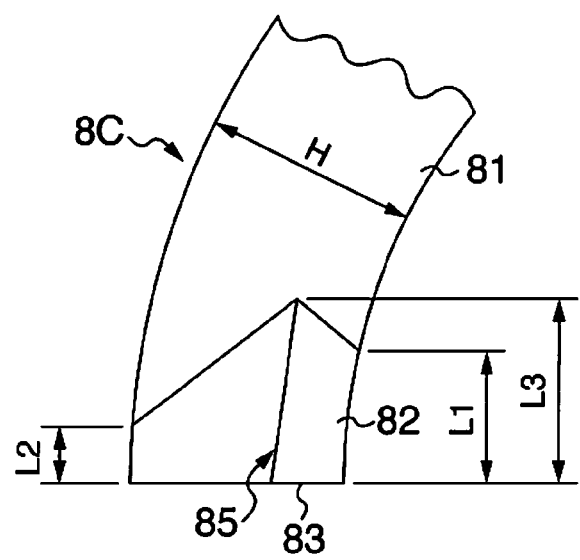
FIG. 12 is a front view of a thrust relief in another mode.
Figure 13:
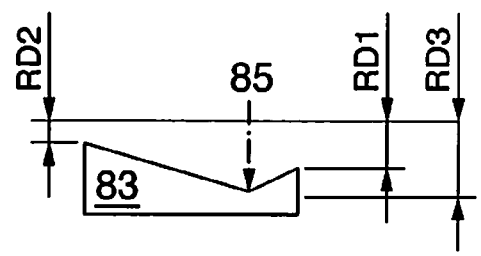
FIG. 13 is an end view showing an end surface in a circumferential direction of the thrust relief of FIG. 12.

In the present embodiment, the half thrust bearing 8B in which the thrust relief 82 is configured by the curved surface is described with use of FIGS. 10 and 11 as above, but the present embodiment is not limited to this. For example, as shown in FIGS. 12 and 13, the configuration of the present embodiment also can be applied to the half thrust bearing 8C in which the thrust relief 82 is configured by combining flat surfaces. Namely, the surface of the thrust relief 82 of the half thrust bearing 8C can be configured by two flat surfaces that intersect each other in a deepest portion 85. The half thrust bearing 8C also has a configuration, operation and effects that are similar to those of the half thrust bearing 8B described above.

Note that the other configurations, and the operation and effects are substantially similar to those of embodiment 1 and 2, and therefore, explanation thereof will be omitted.

Embodiment 4

Hereinafter, with use of FIGS. 15 and 16, a half thrust bearing 8D including the thrust relief 82 of a different mode from those of embodiments 1 to 3 will be described. Note that the same or equivalent portions described in the above described embodiments will be described by assigning the same reference signs thereto.

(Configuration)

First, a configuration will be described. An entire configuration of the bearing device 1 of the present embodiment is similar to that of embodiment 1. A configuration of a half thrust bearing 8D is also substantially similar to that of embodiment 1 except for the shapes of the thrust reliefs 82 and 82.

Figure 15:
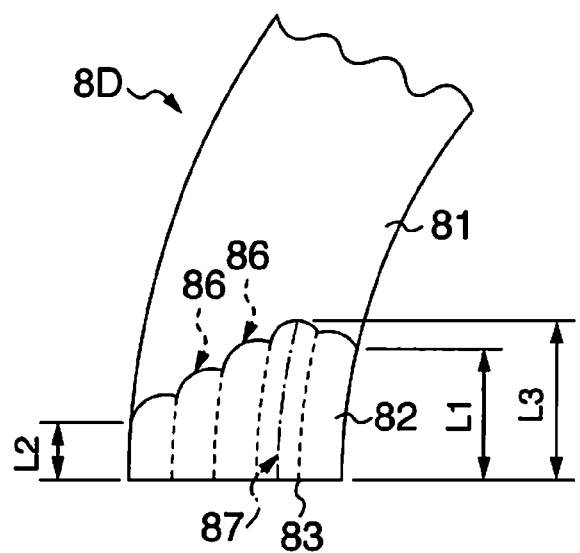
FIG. 15 is a front view of a thrust relief of embodiment 4.
Figure 16:
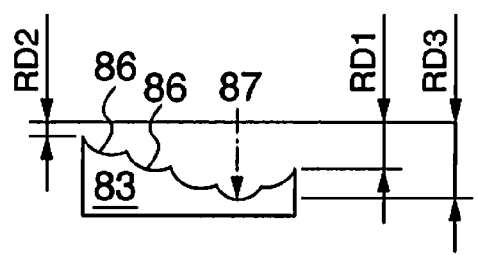
FIG. 16 is an end view showing an end surface in a circumferential direction of the thrust relief of FIG. 15.

However, in the half thrust bearing 8D of the present embodiment, in the thrust relief 82 on the rear side in the rotational direction of the crankshaft or each of both thrust reliefs 82 and 82, the surface of the thrust relief 82 is formed by a plurality of groove portions 86 that are disposed adjacently in the radial direction, as shown in FIGS. 15 and 16.

The respective groove portions 86 are formed to have sections in shallow circular-arc shapes, and are extensively provided along the circumferential direction of the half thrust bearing 8D. End portions on the slide surface 81 side of the respective groove portions 86 are formed into circular arc shapes in front view. Further, the sectional shape of the groove portion 86 does not have to be in a circular arc shape, and may be in a V-shape, a C-shape or the like. Furthermore, an arrangement direction of the groove portions 86 does not have to be along a circumferential direction of the half thrust bearing 8D. Note that in the plurality of groove portions 86, lengths and depths may be set at different dimensions for the respective groove portions 86.

Although the plurality of groove portions 86 are adjacent to one another without a clearance in the radial direction, a flat portion may be present between the groove portion 86 and the groove portion 86. The plurality of groove portions 86 have substantially the same widths, but the groove portions 86 are not limited to this, and the width also may be changed for every groove portion 86.

Further, the number of the plurality of groove portions 86 of the half thrust bearing 8D of the present embodiment is preferably three or more. A length L1 of the groove portion 86 located on an innermost side is longer than a length L2 of the groove portion 86 located on an outermost side. Here, the lengths L1 and L2 refer to perpendicular distances from the end surface 83 in an inner end portion and an outer end portion in the radial direction of the half thrust bearing 8 to points at which the respective groove portions 86 intersect an inner circumferential edge and an outer circumferential edge of the slide surface 81.

A boundary of the plurality of groove portions 86 formed with the slide surface 81 are in a shape with ups and downs (projections and depressions), but an envelope of the boundary is in a convex shape toward the slide surface 81 side as a whole. In other words, a length of a predetermined groove portion 86 located between the groove portion 86 located on the innermost side and the groove portion 86 located on the outermost side is longer than a length of the groove portion 86 located on the innermost side. Note that the groove portion 86 located on the innermost side may have the largest length without being limited to the embodiment.

Furthermore, on the end surface 83, a depth RD1 from the slide surface 81, of the groove portion 86 located on the innermost side is deeper than a depth RD2 from the slide surface 81, of the groove portion 86 located on the outermost side. Here, the depths RD1 and RD2 refer to perpendicular distances to the respective groove portions 86 from flat surfaces (virtual slide surfaces) forming the slide surface 81 in the inner end portion or the outer end portion in the radial direction of the half thrust bearing 8 (see FIG. 16).

In the plurality of groove portions 86, an envelope that connects bottom portions of the groove portions 86 has a section in a concave shape that is recessed from the slide surface 81 side to the opposite surface side as a whole. In other words, the predetermined groove portion 86 located between the groove portion 86 located on the innermost side and the groove portion 86 located on the outermost side is disposed at a position deeper than the depth of the groove portion 86 located on the innermost side.

Further, the groove portion 86 having the maximum depth is located nearer to the inner end portion than the outer end portion. In FIG. 15, the second groove portion 86 from the inner side (the fourth from the outer side) has the maximum depth. Note that, for example, the groove portion 86 located on the innermost side may be a groove portion 86 having the maximum depth without being limited to the embodiment.

Note that the depth RD3 described in embodiment 3 corresponds to the depth at the bottom portion of the groove portion 86 that is located at the deepest position. Similarly, the length L3 described in embodiment 3 corresponds to the length of the longest groove portion 86.

(Operation/Effect)

Next, operation and an effect of the half thrust bearing 8D of the present embodiment will be described.

(1) The surface of the thrust relief 82 of the half thrust bearing 8D of the present embodiment is formed by the plurality of groove portions 86 adjacently disposed in the radial direction. Therefore, operation of guiding the lubricating oil into the respective groove portions 86 is provided. Accordingly, the lubricating oil is dispersed uniformly to the entire slide surface 81 without being locally maldistributed in the slide surface 81.

(2) Further, at least three of the groove portions 86 are provided side by side in the radial direction of the half thrust bearing 8D, whereby a larger amount of lubricating oil can be held, and therefore, a large amount of the lubricating oil easily flows onto the slide surface 81. Furthermore, three or more of the groove portions 86 are present, whereby the convex shape in the boundary formed with the slid surface 81 and the concave shape in the end surface 83 become easily formed.

Further, the plurality of groove portions 86 of the half thrust bearing 8D have the envelope of the boundary formed with the slide surface 81 in the convex shape toward the slide surface 81 side as a whole. Furthermore, the envelope that connects the bottom portions of the groove portions 86 of the half thrust bearing 8D have the section in the concave shape that is recessed to the opposite surface side from the slide surface 81 side as a whole.

According to the configuration as above, the volume itself of the thrust relief clearance becomes large, and therefore, the amount of the lubricating oil that flows into the thrust relief clearance increases. Further, the lubricating oil gathers and a large amount of the lubricating oil easily flows to the slide surface 81 on the distal side in the vicinity of the position where the thrust relief 82 has the maximum length L3.

Note that the other configurations and the operation and effects are substantially similar to those of the aforementioned embodiments, and therefore, explanation thereof will be omitted.

Embodiment 5

Next, with use of FIGS. 2 to 7 and FIGS. 19 to 22, the bearing device 1 including the half thrust bearing of the present invention will be described. Note that the same or equivalent portions as the contents described in the above described embodiments will be described by assigning the same reference signs thereto.

In the present embodiment, the case in which the bearing device 1 includes the half thrust bearing 8 described in embodiment 1 will be described, but even the bearing devices 1 including the half thrust bearings 8A to 8D of embodiments 2 to 4 have operation and effects similar to those of the embodiment shown as follows without being limited to this.

As shown in FIGS. 6 and 7, the bearing device 1 of the present embodiment includes the bearing housing 4 having the cylinder block 2 and the bearing cap 3, the two half bearings 7 and 7 rotatably bearing the journal portion 11 of the crankshaft, and four of the half thrust bearings 8, 8, 8 and 8 that receive an axial force via the thrust collar 12 of the crankshaft.

In the cylinder block 2 and the bearing cap 3 that configure the bearing housing 4, the bearing hole 5 as the holding hole that holds the pair of half bearings 7 and 7 is penetrated and formed in a joint spot thereof.

Figure 19:
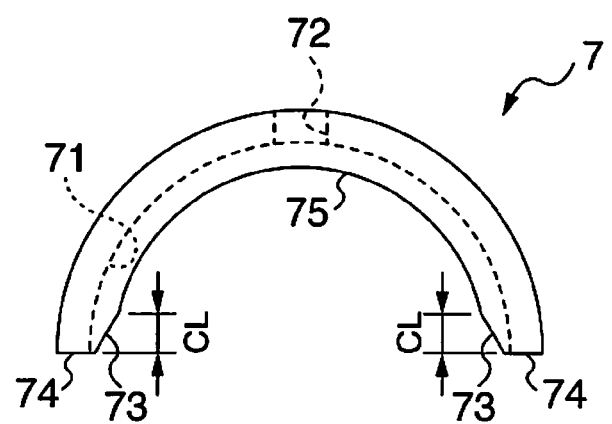
FIG. 19 is a front view of a half bearing of embodiment 5.
Figure 20:
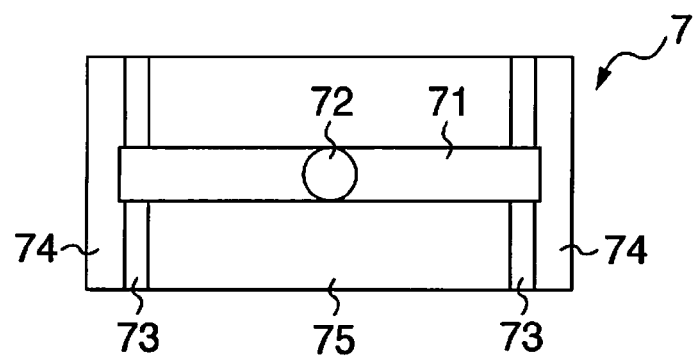
FIG. 20 is a bottom view of the half bearing of FIG. 19 seen from an inner side in a radial direction.

The half bearing 7 includes the crush reliefs 73 and 73 at both end portions in the circumferential direction of the inner circumferential surface. Further, the half bearing 7 on the cylinder block 2 side includes the lubricating oil groove 71 that is disposed along the circumferential direction in the vicinity of the center in the width direction (the axial direction), and the through-hole 72 that penetrates to the outer circumferential surface from the lubricating oil groove 71 on the inner circumferential side, as shown in FIGS. 19 and 20.

On both sides in the axial direction of the pair of half bearings 7 and 7, two pairs of half thrust bearings 8, 8, 8 and 8 are placed. The half thrust bearing 8 is formed into a semicircular ring shape, the center of the outside diameter of the half bearing 7 and the center of the outside diameter of the half thrust bearing 8 are located substantially coaxially, and a horizontal surface that passes through both end surfaces in the circumferential direction of the half bearing 7 and a horizontal surface that passes through both end surfaces in the circumferential direction of the half thrust bearing 8 are placed to be substantially parallel with each other.

Accordingly, as shown in FIG. 6, the crush relief 73 of the half bearing 7 and the thrust relief 82 of the half thrust bearing 8 have one-to-one correspondence with each other. Namely, the crush relief clearance of the half bearing 7 and the thrust relief clearance of the half thrust bearing 8 are at substantially the same angle position seen in the circumferential direction.

As described in embodiment 1, in the half thrust bearing 8, the length L1 of the thrust relief 82 of the inner end portion in the radial direction is made longer than the length L2 of the outer end portion in the radial direction. Further, the area A2 of the thrust relief clearance in the outer end portion is smaller than the area A1 of the thrust relief clearance in the inner end portion.

In addition to the relation of the length L1 and the length L2 described above, and the relation of the area A1 and the area A2, the half thrust bearing 8 of the present embodiment is further in a relation as follows with respect to the half bearing 7.

First, the relation of the lengths will be described. In the half thrust bearing 8 of the present embodiment, the length L1 of the thrust relief 82 of the inner end portion in the radial direction of the thrust relief 82 is longer than a length CL of the crush relief 73 of the corresponding half bearing 7.

Here, the length CL of the crush relief 73 is the length of the crush relief 73 at the axial end portion on the side where the half thrust bearing 8 is placed. Further, the length CL of the crush relief 73 is set at a height to an upper edge of the crush relief 73 from a horizontal surface when the half bearing 7 is placed on the horizontal surface so that both circumferential end surfaces 74 and 74 of the half bearing 7 become lower end surfaces. Note that unlike the embodiment, the length of the crush relief 73 of the half bearing 7 also can be changed in the axial direction of the half bearing 7.

Therefore, the lubricating oil that flows out from the clearance of the crush relief 73 of the half bearing 7 (an opening of the crush relief 73 at the axial end portion of the half bearing 7) easily flows into the thrust relief clearance of the half thrust bearing 8. On the contrary, when the length L1 is shorter than the length CL, the lubricating oil that flows out from the clearance of the crush relief 73 of the half bearing 7 flows also into the clearance between an outside diameter surface of the half bearing 7 and an inside diameter surface of the half thrust bearing 8.

Further, in the half thrust bearing 8 of the present embodiment, the length L2 of the thrust relief 82 of the outer end portion in the radial direction of the thrust relief 82 is shorter than the length CL of the crush relief 73 of the corresponding half bearing 7.

Therefore, the lubricating oil that flows into the thrust relief clearance of the half thrust bearing 8 hardly flows out to the outside from the thrust relief clearance of the outer end portion in the radial direction of the half thrust bearing 8.

As above, in the bearing device 1 of the present invention, the lubricating oil that flows out from the crush relief clearance of the half bearing 7 easily flows into the thrust relief clearance on the rear side in the rotational direction of the crankshaft of the half thrust bearing 8, and the lubricating oil that flows therein hardly flows to the outside from the thrust relief clearance of the outer end portion in the radial direction of the half thrust bearing 8. Therefore, a large amount of the lubricating oil is fed to the slide surface 81 side of the half thrust bearing 8. By the large amount of oil, the slide surface 81 of the half thrust bearing 8 and the surface of the thrust collar 12 of the crankshaft hardly contact each other directly.

As specific dimensions of the crush relief 73 of the half bearing 7, in the case of the crankshaft for a compact internal combustion engine of a passenger car or the like (with the diameter of the journal portion of about 30 to 100 mm), a depth of the crush relief 73 on the end surface 74 from a virtual extension surface that is obtained by extending the slide surface 75, for example, over the crush relief can be set at 0.01 to 0.1 mm, and the length CL of the crush relief 73 can be set at 2 to 15 mm.

Figure 21:
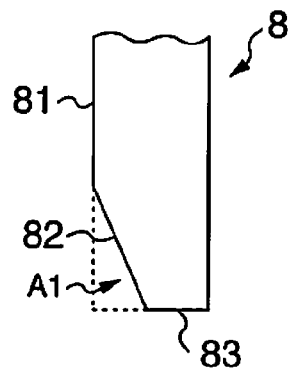
FIG. 21 is a side view of a thrust relief of a half thrust bearing of embodiment 5 seen from an inner side in a radial direction.
Figure 22:
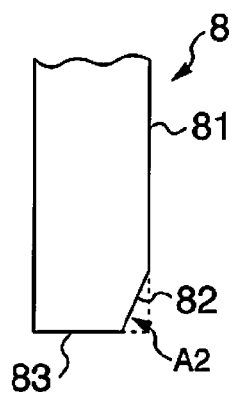
FIG. 22 is a side view of the thrust relief of the half thrust bearing of embodiment 5 seen from an outer side in the radial direction.
Figure 23:
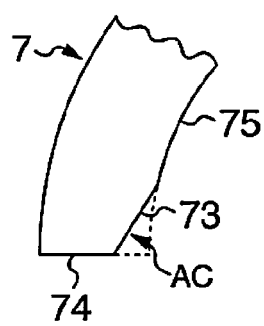
FIG. 23 is a front view of a crush relief of the half bearing of embodiment 5 seen from a front.

Next, with use of FIGS. 21 to 23, the relation of the areas will be described. In the half thrust bearing 8 of the present embodiment, the area A1 of the thrust relief clearance at the inner end portion in the radial direction of the thrust relief 82 is larger than the area AC of the crush relief clearance of the crush relief 73 of the corresponding half bearing 7.

Further, in the half thrust bearing 8 of the present embodiment, the area A2 of the thrust relief clearance at the outer end portion in the radial direction of the thrust relief 82 is smaller than the area AC of the crush relief clearance of the corresponding half bearing 7.

Here, the area A1 of the thrust relief clearance refers to an area of a range surrounded by the surface of the thrust relief 82 at the inner end portion of the slide surface 81, a virtual extension line that is obtained by extending the slide surface 81 over the thrust relief 82, and a virtual extension line that is obtained by extending the circumferential end surface 83 of the half thrust bearing 8 to the thrust relief clearance, seen from the radial direction of the half thrust bearing 8. Further, the area AC of the crush relief clearance refers to an area in a range surrounded by the surface of the crush relief 73 at the end portion of the half bearing 7, a virtual extension line that is obtained by extending the slide surface of the half bearing 7 over the crush relief 73, and a horizontal line connecting circumferential end surfaces at both end portions of the half bearing 7.

As above, in the bearing device 1 of the present invention, the lubricating oil that flows out from the crush relief clearance of the half bearing 7 easily flows into the thrust relief clearance on the rear side in the rotational direction of the crankshaft, of the half thrust bearing 8. Furthermore, the lubricating oil that flows in hardly flows to the outside from the thrust relief clearance of the outer end portion in the circumferential direction of the half thrust bearing 8. Therefore, a large amount of lubricating oil is fed to the slide surface 81 side of the half thrust bearing 8. By the large amount of lubricating oil, the slide surface 81 of the half thrust bearing 8 and the surface of the thrust collar 12 of the crankshaft are difficult to bring into direct contact with each other.

Note that as shown in FIGS. 2 and 7, in the present embodiment, the case in which the aforementioned relations are established between the thrust reliefs 82 and 82 at both circumferential end portions of the half thrust bearing 8 and the crush reliefs 73 and 73 at both circumferential end portions of the half bearing 7 is described, but the present invention is not limited to this. It is necessary just to have to establish the aforementioned relations at least between the thrust relief 82 on the rear side in the rotational direction of the crankshaft and the crush relief 73 that corresponds thereto.

In the present embodiment, the bearing device 1 of the type in which the half bearings 7 and the half thrust bearings 8 are separated is described, but the present invention is not limited thereto, and the present invention also can be applied to the bearing device 1 of the type in which the half bearings 7 and the half thrust bearings 8 are integrated.

Embodiments 1 to 5 of the present invention are described in detail above with reference to the drawings, but the specific configurations are not limited to these embodiments, and the changes in design to such an extent that does not depart from the gist of the present invention are included in the present invention.

Figure 17:
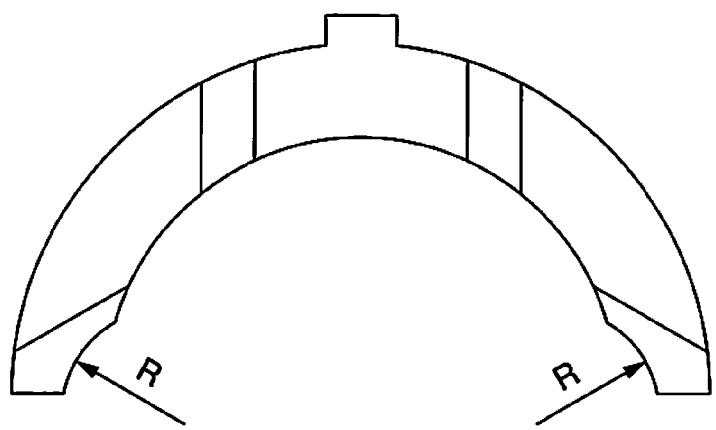
FIG. 17 is a front view of a thrust relief in another mode.
Figure 18:
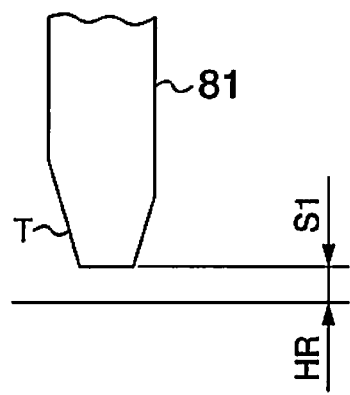
FIG. 18 is a side view of the thrust relief in another mode.

For example, as shown in FIGS. 17 and 18, the present invention also can be applied to half thrust bearings including a protruding portion that protrudes outward in the radial direction for the purpose of positioning and stopping rotation. At both end portions in the circumferential direction of the back surface on the opposite side of the slide surface of the half thrust bearing, rear surface reliefs also can be formed by being provided with tapers T. Further, the circumferential length of the half thrust bearing can be made shorter by a predetermined length S1 than the normal half thrust bearing 8 shown in embodiment 1 or the like. Further, in the half thrust bearing, the inner circumferential surface can be cut into a circular-arc shape with a radius R in the vicinity of the end portion in the circumferential direction.

As above, when the circular-arc cutout with the radius R is formed, the lengths L1 and L2 of the thrust relief 82 and the depths RD1 and RD2 of the thrust relief 82 are expressed by the lengths and the depths which are based on an extension line of the upper edge of the thrust relief 82 and an extension surface of the surface of the thrust relief 82 in the case that no circular-arc-shaped cutout is formed.

Similarly, at the edge portion on the outer side and the edge portion on the inner side in the radial direction of the slide surface side of the half thrust bearing 8, chamfering also can be formed throughout the circumferential direction. In that case, the thrust relief lengths and the thrust relief depths at the inner end portion and the outer end portion are expressed by the thrust relief lengths and the thrust relief depths at the inside diameter side end portion and the outside diameter side end portion position of the half thrust bearing in the case of not forming chamfering.

Further, in the aforementioned embodiment, the case of using four of the half thrust bearings 8 of the present invention per one bearing device 1 is described, but the present invention is not limited thereto, and a desired effect can be obtained by using at least the one half thrust bearing 8 of the present invention. Further, the half thrust bearing 8 of the present invention may be formed integrally at one end surface or both end surfaces in the axial direction of the half bearing 7 that rotatably bears the crankshaft.

Furthermore, in the embodiments, the half thrust bearings 8 to 8D having the thrust reliefs 82 and 82 of the present invention at both end portions in the circumferential direction are described, but the present invention is not limited thereto. The configuration of the thrust relief 82 of the present invention may be adopted only on the rear side in the rotational direction of the crankshaft out of both end portions in the circumferential direction of the half thrust bearing, and at the end portion on the front side in the rotational direction of the crankshaft, the thrust relief of the conventional configuration (see paragraph 0005) or another configuration may be formed.

The invention claimed is:

1. A half thrust bearing having a semicircular ring shape for receiving an axial force of a crankshaft of an internal combustion engine, the half thrust bearing comprising:
   a slide surface;
   an end surface; and
   a thrust relief formed adjacent to the end surface along a circumferential direction of the slide surface, wherein:
   a wall thickness of the thrust relief decreases toward the end surface,
   the thrust relief has an inner end portion and an outer end portion,
   the inner end portion extends circumferentially from the end surface to the slide surface along an inner circumferential perimeter,
   the outer end portion extends circumferentially from the end surface to the slide surface along an outer circumferential perimeter, and
   a length of the inner end portion is longer than a length of the outer end portion.

2. The half thrust bearing according to claim 1, wherein the thrust relief is formed so that at the end surface a depth from the slide surface in the inner end portion is larger than a depth from the slide surface in the outer end portion.

3. The half thrust bearing according to claim 1, wherein the thrust relief is formed so that a length of the thrust relief in a predetermined position between the inner end portion and the outer end portion is longer than the length of the inner end portion of the thrust relief.

4. The half thrust bearing according to claim 3, wherein the thrust relief is formed so that at the end surface a depth of the thrust relief from the slide surface in a predetermined position between the inner end portion and the outer end portion is larger than a depth of the thrust relief from the slide surface in the inner end portion.

5. The half thrust bearing according to claim 4, wherein a deepest portion in a section of the thrust relief perpendicular to the circumferential direction is located nearer to the inner end portion than the outer end portion, in an entire range in the circumferential direction.

6. The half thrust bearing according to claim 1, wherein a surface of the thrust relief is formed by a plurality of groove portions disposed adjacently in a radial direction.

7. The half thrust bearing according to claim 6, wherein at least three of the groove portions are provided side by side in the radial direction of the half thrust bearing.

8. The half thrust bearing according to claim 1, wherein a thrust relief clearance area in the outer end portion is smaller than a thrust relief clearance area in the inner end portion.

9. A bearing device, comprising:
   a crankshaft of an internal combustion engine;
   a pair of half bearings for supporting a journal portion of the crankshaft, each half bearing having crush reliefs formed in both end portions in a circumferential direction of an inner circumferential surface thereof;
   a bearing housing in which a holding hole for holding the pair of half bearings is formed to penetrate therethrough; and
   at least one half thrust bearing disposed at an end surface in an axial direction of the bearing housing, the at least one half thrust bearing being the half thrust bearing according to claim 1,
   wherein the thrust relief of the at least one half thrust bearing is formed so that the length of the inner end portion of the thrust relief of the half thrust bearing is longer than a length of the crush relief of the half bearing corresponding thereto.

10. The bearing device according to claim 9, wherein the thrust relief is formed so that the length of the outer end portion of the thrust relief of the half thrust bearing is shorter than the length of the crush relief of the half bearing corresponding thereto.

11. The bearing device according to claim 9, wherein the thrust relief is formed so that a thrust relief clearance area in the inner end portion of the half thrust bearing is larger than a crush relief clearance area in the end portion of the half bearing corresponding thereto.

12. The bearing device according to claim 9, wherein the thrust relief is formed so that a thrust relief clearance area in the outer end portion of the half thrust bearing is smaller than a crush relief clearance area in the end portion of the half bearing corresponding thereto.

* * * * *